(12) United States Patent
Ellul et al.

(10) Patent No.: US 7,094,837 B1
(45) Date of Patent: Aug. 22, 2006

(54) TRANSLUCENT THERMOPLASTIC ELASTOMERS

(75) Inventors: Maria D. Ellul, Silver Lake Village, OH (US); Donald R. Hazelton, Hudson, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 08/780,507

(22) Filed: Jan. 8, 1997

Related U.S. Application Data

(63) Continuation-in-part of application No. 08/619,135, filed on Mar. 20, 1996, now abandoned, which is a continuation of application No. 08/390,906, filed on Feb. 16, 1995, now abandoned, which is a continuation of application No. 08/206,984, filed on Mar. 4, 1994, now abandoned.

(51) Int. Cl.
*C08F 8/00* (2006.01)

(52) U.S. Cl. ............... 525/193; 525/194; 525/240
(58) Field of Classification Search ........... 525/194, 525/193, 240
See application file for complete search history.

(56) References Cited

U.S. PATENT DOCUMENTS

| | | | |
|---|---|---|---|
| 3,037,954 A | | 6/1962 | Gessler et al. |
| 4,087,485 A | | 5/1978 | Huff |
| 4,113,806 A | | 9/1978 | Watson et al. |
| 4,121,787 A | * | 10/1978 | Wilby ............. 244/35 R |
| 4,130,534 A | | 12/1978 | Coran et al. |
| 4,130,535 A | | 12/1978 | Coran et al. |
| 4,179,299 A | | 12/1979 | Coppola et al. |
| 4,312,954 A | | 1/1982 | Coppola et al. |
| RE32,028 E | | 11/1985 | Fischer |
| 4,603,158 A | | 7/1986 | Markham et al. |
| 4,613,640 A | | 9/1986 | Deisler et al. |
| 5,100,947 A | * | 3/1992 | Puydak et al. ........ 524/423 |
| 5,525,675 A | * | 6/1996 | Masuda ............. 525/194 |

FOREIGN PATENT DOCUMENTS

EP      0 670 350      6/1995

* cited by examiner

*Primary Examiner*—Bernard Lipman
(74) *Attorney, Agent, or Firm*—William Skinner; William Muller

(57) ABSTRACT

Thermoplastic elastomers having the property of optical translucence are provided by incorporating syndiotactic polypropylene homopolymer into olefinic elastomers. The rubber component of the composition is at least partially cured.

5 Claims, No Drawings

TRANSLUCENT THERMOPLASTIC ELASTOMERS

This is a continuation-in-part application of copending application Ser. No. 08/390,135, filed Mar. 20, 1996, now abandoned, which is a continuation of application Ser. No. 08/390,906 filed Feb. 16, 1995, now abandoned, which is a continuation of application Ser. No. 08/206,984, filed Mar. 4, 1994, now abandoned.

BACKGROUND OF THE INVENTION

1. Field of the Invention

This invention relates to thermoplastic elastomers which are optically translucent. A thermoplastic elastomer is generally defined as a polymer or blend of polymers that can be processed and recycled in the same way as a conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

2. Description of the Related Art

Polymer blends which have a combination of both thermoplastic and elastic properties are generally obtained by combining a thermoplastic polyolefin with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a micro-gel dispersion of cured elastomer, such as butyl rubber, chlorinated butyl rubber, polybutadiene or polyisobutene in an uncured matrix of thermoplastic polymer such as polypropylene.

In U.S. Pat. No. Re. 32,028 polymer blends comprising an olefin thermoplastic resin and an olefin copolymer rubber are described, wherein the rubber is dynamically vulcanized to a state of partial cure. The resulting compositions are reprocessible. U.S. Pat. Nos. 4,130,534 and 4,130,535 further disclose thermoplastic elastomer compositions comprising butyl rubber and polyolefin resin, and olefin rubber and polyolefin resin, respectively. The compositions are prepared by dynamic vulcanization and the rubber component is cured to the extent that it is essentially insoluble in conventional solvents. These products are usually opaque even if the individual components have high clarity or the compositions are unfilled. Such opaqueness is attributed to the presence of a two phase system whose domains are larger than the wavelength of light, as well as the color inherent in the compositions.

Flexible thermoset elastomers of good optical clarity have been prepared from EPDM rubber blended with very fine fumed silica and a silane coupling agent (U.S. Pat. No. 4,603,158). More recently polysiloxanes with substituent groups such as methyloctyl have been blended with styrene-ethylene-butylene styrene (SEBS) block copolymer to yield thermoplastic elastomers with good optical properties (U.S. Pat. No. 4,613,640). Also, polypropylene impact blends containing ethylene-propylene copolymers and low density polyethylene and having good optical properties have been described in U.S. Pat. Nos. 4,087,485 and 4,113,806. Unlike thermoplastic elastomers, such impact polymers have poor resistance to compression set.

SUMMARY OF THE INVENTION

The present invention is based on the discovery that a thermoplastic elastomer composition having the property of optical translucence is provided by incorporating syndiotactic polypropylene homopolymer into olefinic thermoplastic elastomers, in combination with the olefin rubber component. The rubber component of the composition is usually present as micron-size particles in the thermoplastic matrix, and it is preferably at least partially cured. Unexpectedly, the inclusion of syndiotactic polypropylene homopolymer in the composition provides a thermoplastic elastomer which has a significantly lowered Gardner haze value, while maintaining the desirable properties of low compression set and thermal stability. The compositions have utility as molded mechanical rubber goods such as face masks and seals, as well as extruded articles such as flexible tubing and fluid delivery bags for medical and other applications.

DESCRIPTION OF THE PREFERRED EMBODIMENTS

Polypropylene

The polypropylene used in the compositions of the invention is a crystalline material which is syndiotactic in structure. The stereochemistry of syndiotactic polypropylene is generally described as one in which the polymer principally contains units of exactly alternating configuration, as opposed to the repeating units with identical configuration in isotactic polypropylene or the random configuration of atactic polypropylene. Syndiotactic polypropylene homopolymer has a density in the range of 0.89–0.91 g/cm$^3$ and a melting point in the range of 135–140° C. It may be prepared by several known processes, including the use of ionic catalysts such as the reaction product of metallocene and an activator compound as described in published European Patent Application 548274. The syndiotactic polypropylene has a syndiotactic pentad fraction of at least 0.86; it may contain minor amounts of isotactic or random polypropylene.

The amount of polypropylene found to provide useful translucent compositions is generally from about 10 to about 90 weight percent, based on the weight of the rubber and polypropylene. Preferably, the polypropylene content of the composition will range from about 25 to about 90 percent by weight, with a most preferred range of about 60 to about 90 percent by weight.

Olefinic Rubber

Suitable olefin copolymer rubbers comprise non-polar, essentially non-crystalline, rubbery copolymers of two or more α-olefins, preferably copolymerized with at least one polyene, usually a diene. Saturated olefin copolymer rubber, for example ethylene-propylene copolymer rubber (EPM) can be used. However, unsaturated olefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); and the like. Blends of any of the above olefinic rubbers can be employed, rather than a single olefinic rubber.

In preparing the compositions of the invention, the amount of olefinic rubber generally ranges from about 90 to about 10 weight percent, based on the weight of the rubber and polypropylene. Preferably, the olefinic rubber content will be in the range of from about 74 to about 10 weight percent, with a most preferred range of about 40 to about 10 weight percent.

It is also preferred that the ethylene ($C_2$) content of the olefinic rubber be about 45 weight percent or higher. When the $C_2$ content of the rubber component is lower, the desired translucent properties of the compositions are greatly reduced. With $C_2$ content above about 45 weight percent, there appears to be a synergism between the syndiotactic polypropylene and the olefinic rubber which results in a significant improvement in translucence of the thermoplastic elastomer product. Olefinic rubbers having a $C_2$ content greater than about 65 weight percent are most preferred.

Curing Agent

Those ordinarily skilled in the art will appreciate the appropriate quantities, types of cure systems and vulcanization conditions required to carry out the vulcanization of the rubber. The rubber can be vulcanized using varying amounts of curative, varying temperatures and varying time of cure in order to obtain the optimum crosslinking desired. Any known cure system for the rubber can be used, so long as it is suitable under the vulcanization conditions with the specific olefinic rubber or combination of rubbers being used and with the polyolefin. These curatives include sulfur, sulfur donors, metal oxides, resin systems, peroxide-based systems and the like, both with and without accelerators and co-agents. Peroxide curatives are preferred for the preparation of the translucent compositions of the invention, since they do not introduce color. Such cure systems are well known in the art and literature of vulcanization of elastomers.

Processing

The olefin rubber component of the thermoplastic elastomer is generally present as micron or submicron size particles within a continuous polyolefin matrix. Alternatively, depending on mixing conditions and compositions, cocontinuous phase morphologies or a mixture of discrete and cocontinuous phase morphologies are also possible. The rubber is desirably at least partially crosslinked, and preferably is completely or fully crosslinked. The partial or complete crosslinking can be achieved by adding an appropriate rubber curative to the blend of polyolefin and rubber and vulcanizing the rubber to the desired degree under conventional vulcanizing conditions. However, it is preferred that the rubber be crosslinked by the process of dynamic vulcanization. As used in the specification and claims, the term "dynamic vulcanization" means a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although as noted above other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

The terms "fully vulcanized" and "completely vulcanized" as used in the specification and claims means that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art, for example in U.S. Pat. Nos. 5,100,947 and 5,157,081, both of which are fully incorporated herein by this reference.

The following general procedure was used in the preparation of thermoplastic elastomers of the invention, as set forth in the examples. The rubber plus peroxide curative and a coagent were mixed in a Brabender mixer of 80 cc capacity at 100 rpm. The temperature in the mixer was maintained below about 130° C. in order to disperse the curative without prematurely vulcanizing the rubber. The mix was then combined with the polypropylene and masticated under nitrogen at a temperature in the range of 160–190° C. to dynamically vulcanize the rubber in the blend. When the cure was as complete as desired an antioxidant was added and mixing continued for up to about 15 minutes.

Nucleating agents for polypropylene, such as Millad 3905, may also be added in small amounts (0.1 to 1.0 phr) but mixing must then be carried out at 230° C.

Compression molded plaques of about 1.6 mm thickness were prepared at about 200° C. from the dynamically vulcanized alloy (DVA), followed by cooling in the mold to minimize distortion. These test plaques were used for the measurement of physical and optical properties. Haze of the compositions was measured following the procedure of ASTM D 1003-61, with a Gardner brand Model XL-211 hazemeter. In this measurement a completely opaque material has a reading of 100%, and lower values indicate better optical clarity. No attempt was made to prepare plaques having "smooth" surfaces, and therefore the measured haze values are higher than if the plaques had an optically smooth texture.

The present invention will be better understood by reference to the following examples which serve to illustrate but not limit the invention.

EXAMPLE 1

Dynamic vulcanizates were prepared following the general procedure described above, with syndiotactic polypropylene, isotactic polypropylene, random tacticity polypropylene and impact modified polypropylene. The elastomer component of the composition was selected from EPDM rubbers having ethylene ($C_2$) content in the range of 48–77%. The ratio of components was 76 weight percent EPDM rubber and 24 weight percent polypropylene. The compositions also included 0.51 phr (parts per hundred rubber), same as 0.39 parts per hundred based on the sum of the EPDM rubber and the polypropylene, of α–α'-bis (t-butyl peroxy)diisopropylbenzene curative, 1.65 phr of tri-allyl cyanurate coagent and 1.5 phr of bis(2,4-di-t-butylphenyl) pentaerythritol diphosphate antioxidant. Plaques were prepared from the finished compositions as described above, and haze values were determined. Results are set forth in Table I.

TABLE I

|  | % Haze | | |
| --- | --- | --- | --- |
|  | EPDM "A" (48% $C_2$) | EPDM "F" (74% $C_2$) | EPDM "G" (77% $C_2$) |
| Impact polypropylene | — | 100% | — |
| Isotactic polypropylene | 100 | 100 | 100 |
| Random polypropylene | 100 | 71 | 78 |
| Syndiotactic polypropylene "1" | 86 | 39 | 36 |
| Syndiotactic polypropylene "2" | — | 36 | — |
| Syndiotactic polypropylene "3" | — | 27 | — |

As demonstrated by these results, thermoplastic elastomers prepared using syndiotactic polypropylene homopolymer show a striking improvement in optical translucence, as compared with compositions containing isotactic, random or impact forms of polypropylene.

EXAMPLE 2

Dynamic vulcanizates were prepared using the general method described above, with syndiotactic polypropylene "1" homopolymer and EPDM rubbers having $C_2$ contents in the range of 48–77 percent. In all cases the ratio of EPDM to polypropylene was 75/25, and the curatives and antioxidant were as set forth in Example 1. The compositions were prepared using total mixing times of seven minutes and fifteen minutes respectively. Plaques were prepared and haze values determined as described above. The results are set forth in Table II.

TABLE II

|  |  | Haze Values (%) | |
| --- | --- | --- | --- |
| EPDM | Wt. % $C_2$ | 7 min. mixing | 15 min. mixing |
| "A" | 48 | 90 | 86 |
| "B" | 68 | 70 | 53 |
| "C" | 70 | 65 | 60 |
| "D" | 71 | 58 | 51 |
| "E" | 72 | 69 | 57 |
| "F" | 74 | 48 | 29 |
| "G" | 77 | 46 | 36 |

It can be seen from these results that the ethylene content of the rubber component has a synergistic effect on the optical characteristics of the thermoplastic elastomers. Higher $C_2$ content provides a product of increased clarity, while a $C_2$ content below about 48 weight percent provides little if any of the translucent properties desired in the compositions of the invention. A longer mixing period after vulcanization of the blend also improves the optical properties in most instances, probably due to a reduction in particle size of the cured elastomer thus reducing the tendency to scatter light.

EXAMPLE 3

A series of dynamic vulcanizates was prepared over a range of EPDM/polypropylene ratios, using the method described above. The curatives and antioxidant were as in Example 1, and mixing time was 12–15 minutes. Plaques were prepared and haze values determined. The results are shown in Table III.

TABLE III

|  | EPDM/PP (76/24) | EPDM/PP (50/50) | EPDM/PP (29/71) |
| --- | --- | --- | --- |
| EPDM "F", phr | 100 | 100 | 100 |
| Polypropylene "1", phr | 32 | 100 | 250 |
| Gardner haze, % | 40 | 54 | 66 |

The translucent compositions of the invention can be prepared over a broad range of rubber/polypropylene ratios.

EXAMPLE 4

Compositions of the invention were prepared including a mineral oil additive to determine the effect of oil on optical clarity. Thermoplastic elastomers were prepared as described above, using a rubber/polypropylene ratio of 75/25 and a total mixing time of about 25 minutes. Plaques were prepared and both optical and physical properties were determined. Results are set forth in Table IV.

TABLE IV

|  | I | II | III | IV |
| --- | --- | --- | --- | --- |
| EPDM "F", phr | 100 | 100 | — | — |
| EPDM "G", phr | — | — | 100 | 100 |
| Polypropylene "1", phr | 32 | 32 | 32 | 32 |
| Mineral oil[1], phr | 0 | 48 | 0 | 48 |
| Curative[2], phr | 0.51 | 0.51 | 0.51 | 0.51 |
| Coagent[2], phr | 1.65 | 1.65 | 1.65 | 1.65 |
| Antioxidant[2], phr | 1.5 | 1.5 | 1.5 | 1.5 |
| Hardness (Shore A) | 88 | 65 | 85 | 58 |
| Stress at 100% strain[3] (MPa) | 4.7 | 7.1 | 5.6 | 7.0 |
| Tensile strength[3] (MPa) | 10.3 | 9.6 | 7.8 | 9.8 |
| Elongation at break[3] (%) | 374 | 402 | 187 | 391 |
| Compression set[4] (%) (22 hours/100° C.) | 39 | 27 | 33 | — |
| Haze (%) | 40 | 38 | 33 | 40 |

[1]fully saturated paraffinic oil [HT Brightstock, from Petrocanada]
[2]same as in Example 1
[3]ASTM D 412
[4]ASTM D 395B As can been seen from these results, the inclusion of mineral oil had no significant effect on the optical properties of the DVAs.

The components used in the foregoing examples are described in Table V.

TABLE V

| | |
| --- | --- |
| Polypropylene "1" | Syndiotactic homopolymer [Grade G49M, Hoechst AG] having a syndiotactic pentad fraction of 0.86 |
| Polypropylene "2" | Syndiotactic homopolymer [Grade G53, Hoechst AG] having a syndiotactic pentad fraction of 0.87 |
| Polypropylene "3" | Syndiotactic homopolymer [Grade G20/28, Hoechst AG] having a syndiotactic pentad fraction of 0.87 |
| Random polypropylene | Random tacticity copolymer [Escorene PD9272, Exxon] |
| Isotactic polypropylene | Isotactic homopolymer [Rexene 11s07a, Lyondel] |
| Impact polypropylene | Impact modified copolymer [Escorene 7031, Exxon] |
| EPDM "A" | Ethylene-propylene-diene terpolymer [Vistalon 4608, Exxon] |
| EPDM "B" | Ethylene-propylene-diene terpolymer [Vistalon 707, Exxon] |
| EPDM "C" | Ethylene-propylene-diene terpolymer [Vistalon 7000, Exxon] |

TABLE V-continued

| | |
|---|---|
| EPDM "D" | Ethylene-propylene-diene terpolymer [Epsyn 5508, Copolymer] |
| EPDM "E" | Ethylene-propylene-diene terpolymer [Dutral 033/E, Montedison] |
| EPDM "F" | Ethylene-propylene-diene terpolymer [Vistalon 8731, Exxon] |
| EPDM "G" | Ethylene-propylene-diene terpolymer [Nordel 2722, Dupont] |

Syndiotactic pentad (rrrr) fractions were determined from NMR spectroscopy of samples dissolved in a 9:1 mixture of trichlorbenzene and perdeuterobenzene.

While the best mode and preferred embodiment of the invention have been set forth in accord with the Patent Statutes, the scope of the invention is not limited thereto, but rather is defined by the claims which follow.

What is claimed is:

1. An optically translucent thermoplastic elastomer comprising
    (A) 10 to 90 weight percent, based upon the weight of the rubber and polypropylene, of propylene homopolymer principally containing propylene units of exactly alternating configuration and having a syndiotactic pentad fraction of at least 0.86, and
    (B) 90 to 10 weight percent, based upon the weight of the rubber and polypropylene, of an ethylene-propylene-nonconjugated diene terpolymer rubber and/or an ethylene-propylene copolymer rubber, said component (B) having an ethylene content of at least 74 wt % and having been completely crosslinked.

2. The thermoplastic elastomer of claim 1 wherein component (A) has a density of 0.89 to 0.91 g/cm$^3$ and a melting point of 135° C. to 140° C.

3. The thermoplastic elastomer of claim 1 wherein component (B) is an ethylene-propylene-diene terpolymer having an ethylene content between 74 wt % and 77 wt %.

4. The thermoplastic elastomer of claim 1 including a mineral oil and an antioxidant.

5. The thermoplastic elastomer of claim 1 having a haze value of 50% or less, as measured by ASTM D1003-61.

* * * * *